UNITED STATES PATENT OFFICE.

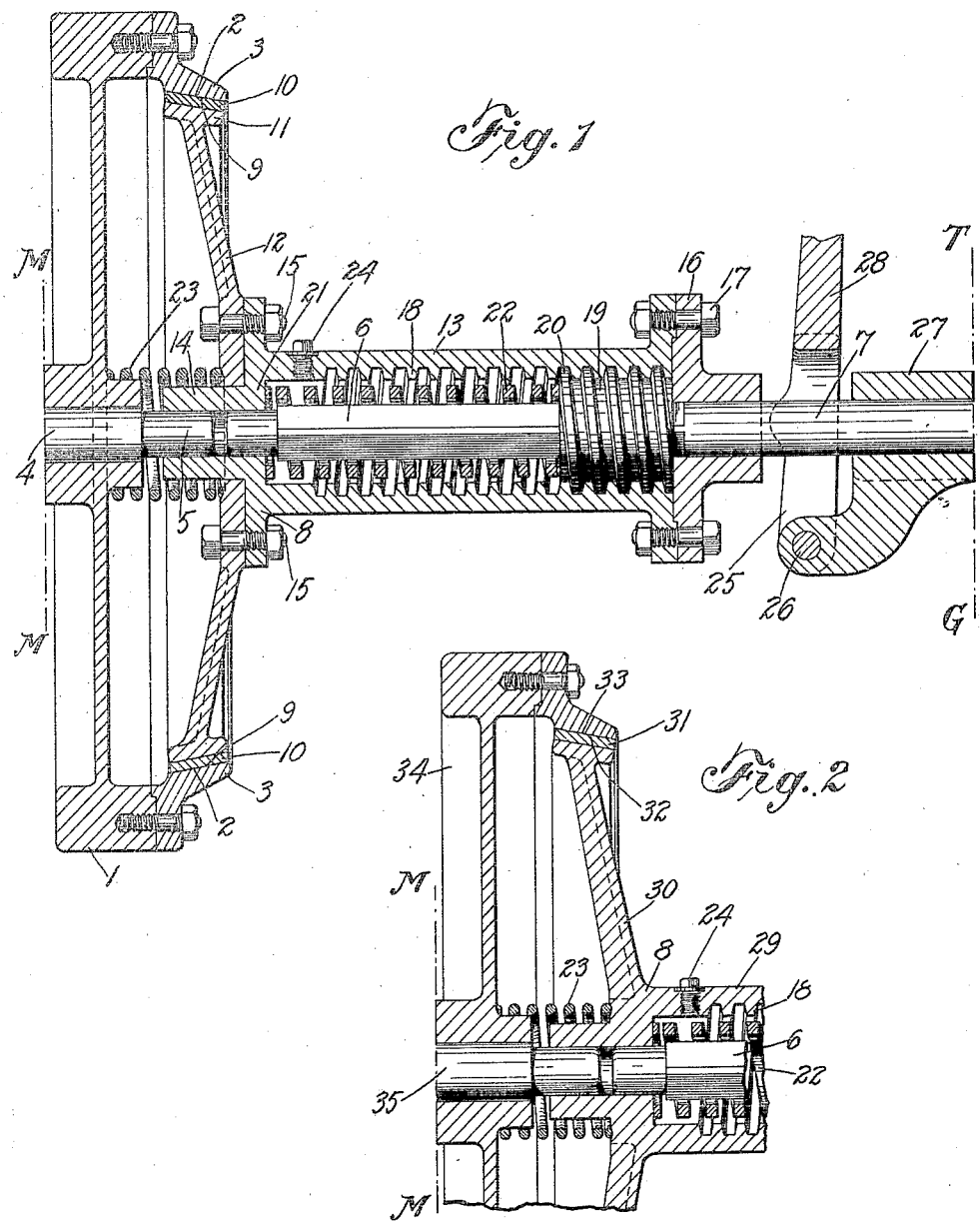

SYDNEY I. PRESCOTT, OF BROOKLYN, NEW YORK.

CLUTCH.

1,049,531. Specification of Letters Patent. Patented Jan. 7, 1913.

Application filed April 13, 1912. Serial No. 690,555.

*To all whom it may concern:*

Be it known that I, SYDNEY I. PRESCOTT, a citizen of the United States, residing at Brooklyn, county of Kings, and State of New York, have invented a new and useful Improvement in Clutches, of which the following is a specification.

This invention relates to an improvement in clutches, particularly those of the type used in the driving mechanism of motor cars or automobiles.

Two general types of clutches designed particularly for use on motor cars have heretofore been in common use. One type includes a female cone clutch member carried by and rotating with or forming a part of the flywheel of an internal combustion motor, and also includes a coöperating male cone clutch member rotatable with the transmission shaft and movable in and out of engagement with the other clutch member. In clutches of this type, it has been customary to provide means, such for instance as a plurality of spring pressed plungers, radially mounted in the male cone clutch member, for permitting a progressively decreasing relative slip of the clutch members as they are brought into engagement. The other type includes a series of friction disks alternately carried by a driving clutch member which derives motion from an internal combustion motor, and by a driven clutch member which is adapted to rotate with a transmission shaft. These disks are brought into engagement by means of a spring designed to permit a gradually decreasing slip of the disks as the clutch members are brought into engagement. In both types, however, there can be no slip after the clutch members are in full engagement. The driving friction must be sufficient to transmit the maximum power of the motor, without any slip of the clutch members; otherwise, control of motion of the car under maximum power and maximum load would be lost.

It is well known that the power of an internal combustion motor is delivered to the transmission shaft by a series of blows due to the successive explosions occurring in the motor, and that these blows are transmitted through the entire driving mechanism; that is to say, through the clutch, the transmission gearing, the universal joint or joints, the propeller shaft, the differential gearing, and finally to the tires of the driving wheels. It is well known, also, that this action of the motor results in excessive wear and tear upon the entire transmission mechanism and tires, and that it sometimes results in derangement or breakage of one or more parts of the transmission mechanism. It is well known, also, that an internal combustion engine must be running at considerable speed before it can be clutched to the driving mechanism of a motor car.

The clutches heretofore known are intended to permit the motor to pick up the load and start the car without stalling or stopping the motor, but the load on the motor is not confined to the initial load; that is to say, the load due to the starting of the car. When a car is running at slow or moderate speed, and an increase of speed is desired, the throttle is opened to admit more gas to the motor cylinders. This results in a sudden increase in the force of the blows delivered by the exploding gas to the transmission mechanism. An ordinary clutch connecting the motor and the transmission mechanism is incapable of eliminating the shock due to this sudden increase of force, because its members are in full engagement at the time, and when in full engagement cannot slip under maximum power and load, and consequently cannot slip under lower power or lighter load. The manipulation of the change speed gearing is a further cause of shock to the transmission gearing and driving tires. Excessive shock to the transmitting mechanism and driving tires is sometimes due to other causes which need not be mentioned herein.

Heretofore, various devices have been proposed for installation on a shaft line, the purpose of which is to absorb the shock of a sudden change in the relative speed of the driving and driven shaft mounted in alinement. To include such a device in the transmission mechanism of a motor car driven by an internal combustion motor is to add a new element to a transmission train or system already complicated.

The main object of the present invention is to simplify the transmission mechanism of a motor car driven by an internal combustion motor; and at the same time to provide means for eliminating the excessive stresses set up in the various elements of the transmission mechanism and in the driving tires by the shock due to the explosion of gas in the motor.

A further object is to provide an automatic clutch having three distinct functions; first, to transmit motion from a motor to a transmission shaft which in turn transmits motion to the other elements of the transmission mechanism; second, to absorb the shock due to the gas explosions whenever the same is suddenly applied or suddenly increased, so that the entire train of transmission mechanism and the driving tires are relieved from excessive stresses; third, to permit the motor to make several revolutions after the clutch members have been brought into positive driving engagement, the load being gradually picked up during these several revolutions against gradually increasing resistance, so that in the event of opening the throttle when the car is in motion the motor is permitted to acquire greater speed and consequently greater power before it becomes positively locked to the transmission mechanism.

A further object is the production of a device in which the above mentioned functions are performed, said device involving the least number of elements possible to employ and accomplish the desired end, so that the initial cost of the transmission mechanism is reduced, the cost of maintenance is reduced, the wear and tear upon the entire transmission mechanism is reduced, and the efficiency of the motor and the transmission mechanism driven thereby is increased.

With these and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Figure 1 is a sectional view of a device constructed in accordance with the invention, and Fig. 2 is a sectional view of a modified form of the structure shown in Fig. 1.

The device selected to illustrate the invention constitutes a concrete embodiment of the invention, but it is to be understood that the various elements of the structure shown and described may be varied in construction within wide limits, and that the invention, therefore, is not to be restricted to the precise details of the structure shown and described.

In the device selected to illustrate the invention, 1 indicates a motor driven member carrying an annular frictional driving surface 2, which surface is the inner periphery of a female cone clutch member 3. The motor driven member is supported and rotated by means of a driving shaft 4 having a tail 5 projecting beyond the hub of the motor driven member. This motor driven member 1 and driving shaft 4 may be respectively the flywheel and the crank shaft of an internal combustion motor, not shown but located at the left of the line M—M. A transmission shaft is provided which is adapted to transmit motion from the motor driven member 1 to the transmission gearing and other transmission mechanism, not shown but located at the right of the line T—G. This shaft has a squared end 6, and a cylindrical end 7 extending to the transmission gearing. There is further provided a clutch member 8 interposed between the motor driven member 1 and the transmission shaft 6—7. This clutch member is provided with an annular frictional driving surface 9 adapted to coöperate with the frictional driving surface 2 before referred to. This surface 9 is the outer surface of a ring 10 of leather or other suitable material, said ring being securely fastened to the rim 11 of a member 12 located in close proximity to the motor driven member 1 before referred to. This member 12, with the ring 10, forms a male cone clutch member, and the frictional driving contact of the surfaces 2 and 9 is sufficient when fully engaged to cause the clutch member 8 to be rotated without slip under any load. For the reason that the surfaces 2 and 9 operate primarily to transmit motion from the motor driven member 1 to the transmission shaft 6—7, and for the further reason that the clutch member has additional frictional driving surfaces, said surfaces 2 and 9 may be termed primary frictional driving surfaces.

The clutch member 8 includes the member 12 and a sleeve 13 extending rearwardly from the center of the member 12 and at right angles to the diametrical planes of the surface 9, and the member 12 is held in position to positively rotate with the reduced end 14 of the sleeve 13, by means of a series of bolts 15. The reduced end of the sleeve is journaled upon the projecting tail 5 of the driving shaft. This is for the purpose of permitting longitudinal movement of the clutch member to throw it in and out of engagement with the motor driven member. The sleeve 13 is further provided with a bearing 16 secured to its rear end by a series of bolts 17. The shaft 6—7 projects through this bearing and is adapted to rotate therein; and the bearing is adapted to move longitudinally on the shaft 6—7.

The sleeve 13 is provided with an internal thread 18, the operating face of which constitutes a secondary frictional surface carried by the clutch member. There is further provided what may be termed a transmission member, consisting of a worm 19 having an external thread 20 the operating face of which constitutes what may be termed a secondary frictional surface. This secondary surface coöperates with the thread or secondary frictional surface 18 of the clutch member. The length of the sleeve and the pitch of the worm are designed to permit several revolutions of the sleeve on the worm while the latter is traveling from one extreme position to the other. The transmission member or worm 19 is provided with a central squared aperture engaging the squared end 6 of the transmitting shaft 6—7, so that said transmission member is always rotatable with and is slidable upon said transmission shaft.

A pressure device is provided which engages an internal abutment 21 formed in the clutch member 8, and also engages the transmission member or worm 19. This pressure device consists of a spring 22 coiled around the squared end of the transmission shaft. The pressure device is adapted to hold the secondary frictional surfaces in contact under sufficient pressure to prevent slipping of said secondary surfaces under a normal load, and adapted to permit relative slip of said secondary surfaces for a plurality of turns under a load above normal. It is to be understood that the spring 22 is designed to produce the desired result when used with a motor of a given power and car of a given weight, and that, when the power and weight are different, a different spring must be used.

By an inspection of Fig. 1, it will be noted that the internal thread of the sleeve is right-handed, and that the spring 22 is coiled left-handed. This is to prevent the possibility of a turn of the spring catching on the edge of the thread during compression.

It may be here remarked that what is meant herein by the term "normal load" is the load on the motor of the car under normal running conditions; that is to say, when the car is running along at a moderate speed on a level road. It is well known that it requires more power to start a car and cause it to acquire a certain speed, than it does to maintain the speed on a level road. The load on the motor in such case is therefore above what is termed herein a normal load. It is well known, also, that it requires more power to change the speed of a car from low speed to high sped, than it does to maintain that high speed when reached. It will therefore be understood that the load on the motor at such time is above normal load.

It will be readily understood that when the motor driven member 1 and the clutch member 8 begin to rotate in locked engagement while the transmission shaft 6—7 is not rotating, and also when the motor driven member 1 and clutch member 8 are rotating faster than the transmission shaft 6—7, the transmission member 19 will be caused to move forward and compress the spring 22, which in turn will progressively increase the friction of the secondary surfaces, and thereby progressively increase the torque and speed of the transmission shaft. If the overload at the moment is not great, the load will be picked up and the transmission shaft 6—7 will acquire the same speed as the motor driven member 1 before the spring is completely compressed, and before the transmission member has reached the limit of its movement. If, however, the overload is great, the transmission member will travel to the limit of its movement, and the transmission shaft 6—7 will then be positively rotated by the clutch member 8. After the desired speed of the transmission shaft 6—7 is reached, the necessity for the degree of power required to reach this speed ceases, and the supply of gas may then be throttled slightly to cause the motor to develop only the power necessary to maintain the desired speed of the transmission shaft 6—7. This throttling action results in momentarily slowing down the motor driven member 1, while the acquired momentum of the load or moving car momentarily maintains the acquired speed of the transmission shaft 6—7. This produces a reverse action of the sleeve 13 and worm 19, and this reverse action returns the worm to its normal position at the rear end of the sleeve; that is, the position shown in the drawings. The power of the throttled motor being sufficient to keep the car in motion at the normal speed, or what is herein termed under normal load, and the pressure device being adapted to prevent slipping of the secondary surfaces under a normal load, the car will go on with the parts in the position shown in Fig. 1. If, at any time thereafter, it is desired to increase the speed of the car, the throttle is opened and this results in the introduction of more gas into the cylinders of the motor and consequently an increase in the force of the explosion. This results in increased stresses, suddenly applied. In transmission systems heretofore known, these stresses are communicated to the transmission mechanism and also to the driving tires. Moreover, while the sudden introduction of more gas into the cylinders of the motor results in increased power, yet full power of the motor, in proportion to the quantity of gas used, is not reached until the motor has acquired increased speed. In the constructions heretofore used, the motor cannot acquire this increased speed, and consequently increased power, until the speed of the car has also been increased. The motor is therefore working under a load above normal while it is thus increasing its own speed and the speed of the car. Under similar circumstances, the present device permits the motor to make several revolutions at a speed higher than the speed of the transmission shaft 6—7, while it is increasing its own power and while it is progressively increasing the speed of the transmission shaft and car. The device acts automatically in this case as well as when the car is started, and the worm is returned to its normal position, when the desired increased speed is reached, in precisely the same manner as before. If the car suddenly reaches a heavy grade, where it is necessary to change the gears in order to use the full power of the motor for driving the increased load, the device again automatically comes into action, relieving the transmission mechanism and tires of the excessive stresses caused by the sudden change of gearing and motor speed, and, if the full power of the motor is required to cause the car to climb the grade, the transmission member or worm will remain in its forward position and positively drive the transmission shaft and car until the applied power is reduced. It will then return to its normal position.

Means are provided for producing a bodily movement of the clutch member toward and away from the primary frictional surface 2, in order to throw the clutch member in and out of engagement with the motor driven member. This means consists in a spring 23 interposed between the hub of the motor driven member and the end of the sleeve 13. This spring normally operates to move the clutch member bodily rearwardly, and to hold the primary frictional driving surfaces 2 and 9 in contact. A screw plug 24 is threaded in the sleeve 13 near its forward end. The object of this screw plug is to close an opening through which oil or other lubricant may be introduced into the interior of the sleeve. A small quantity of lubricant within the sleeve 13 will be carried to all the wearing surfaces within the sleeve by the rotation of said sleeve, and since it cannot escape from the sleeve, the necessity for frequent lubrication is eliminated.

Manually operated means are provided for throwing the primary frictional driving surfaces out of engagement. This means consists of a forked lever 25 straddling the shaft 6—7 at the rear and bearing against the end of the bearing 16. This lever is fulcrumed at 26 to a boss formed on a bearing 27 which forms a part of the transmission gearing box not fully shown. The fork has a lever 28 extending upwardly to any convenient position. A forward movement of this lever results in forcing the clutch member 8 bodily forward to disengage the primary frictional driving surfaces 2 and 9.

In the modified device shown in Fig. 2, a sleeve 29, corresponding in other respects to the sleeve 13, is formed integrally with a member 30 carrying a leather ring 31, which ring corresponds in all respects with the ring 10. The outer surface 32 of the ring 31 engages the frictional surface 33 of the motor driven member 34 similar to the motor driven member 1. A shaft 35 supports and drives the motor driven member 34, and projects beyond the face of the hub thereof. The projecting end of the shaft 35 serves to support the sleeve 29.

In carrying the present invention into effect, relating as it does to a single device capable of automatically performing the three distinct functions hereinbefore described, the resultant device is simpler and less expensive than any practical device heretofore known which is capable of performing either one of the functions above mentioned. Moreover, the device used to illustrate the invention consists in a combination of coöperating elements directly connected with the source of power and high speed member of the transmission train, relieves the entire transmission mechanism and the driving tires from excessive shock the source of which lies in the motor, and further, permits the motor to acquire greater speed and greater power as it picks up its load. This results in increasing the durability and the efficiency of the power system as a whole.

In view of the foregoing, a detailed description of the operation of the device is deemed unnecessary and is therefore omitted in the interest of brevity.

What is claimed is:

1. The combination with a motor driven member having a frictional driving surface, of a transmission shaft, a clutch member interposed between said motor driven member and said shaft and having a primary frictional driving surface coöperating with the frictional driving surface of the motor driven member when fully engaged therewith to cause the clutch member to be rotated without slip under any load, said clutch member also having a secondary frictional surface, a transmission member rotatable with the transmission shaft and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of the clutch member toward and away from the motor driven member.

2. The combination with a motor driven member having a frictional driving surface, of a transmission shaft, a clutch member interposed between said motor driven member and said shaft and having a primary frictional driving surface coöperating with the frictional driving surface of the motor driven member when fully engaged therewith to cause the clutch member to be rotated without slip under any load, said clutch member also having a secondary frictional surface, a transmission member rotatable with the transmission shaft and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, a common support for the motor driven member and the adjacent end of the clutch member, and means for producing a bodily movement of the clutch member toward and away from the motor driven member.

3. The combination with a motor driven member having a frictional driving surface, of a driving shaft supporting, rotating and projecting beyond said motor driven member, a transmission shaft, a clutch member interposed between said motor driven member and said shaft and slidably and rotatably supported on the projecting end of said driving shaft and having a primary frictional driving surface coöperating with the frictional driving surface of the motor driven member when fully engaged therewith to cause the clutch member to be rotated without slip under any load, said clutch member also having a secondary frictional surface, a transmission member rotatable with the transmission shaft and having a secondary frictional surface coöperating with the secondary surface of the clutch member, a pressure device engaging the clutch member and transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of the clutch member toward and away from the motor driven member.

4. The combination with a motor driven member having a frictional driving surface, of a driving shaft supporting, rotating and projecting beyond said motor driven member, a transmission shaft, a clutch member interposed between said motor driven member and said shaft and slidably and rotatably supported on the projecting end of the driving shaft and having a primary frictional driving surface coöperating with the frictional driving surface of the motor driven member when fully engaged therewith to cause the clutch member to be rotated without slip under any load, said clutch member also having a secondary frictional surface, a transmission member rotatable with the transmission shaft and having a secondary frictional surface coöperating with the secondary frictional surface of the clutch member, a pressure device engaging said clutch member and said transmission member and adapted to hold the secondary surfaces in contact under sufficient pressure to prevent slipping of said surfaces under normal load and adapted to permit the transmission member to move against progressively increasing pressure under load above normal to permit a relative slip of said secondary surfaces corresponding to a plurality of turns, and means for producing a bodily movement of the clutch member toward and away from the motor driven member.

5. The combination with a motor driven member having a frictional driving surface, of a transmission shaft, a clutch member interposed between said motor driven member and said shaft and having a primary frictional driving surface coöperating with the frictional driving surface of the motor driven member when fully engaged therewith to cause the clutch member to be rotated without slip under any load, said clutch member also having a secondary frictional surface, a transmission member rotatable with the transmission shaft and having a coöperating secondary frictional surface, a compression spring engaging said clutch member and said transmission member and adapted to hold the secondary surfaces in contact under sufficient pressure to prevent slipping of said surfaces under normal load and adapted to permit the transmission member to move against the progressively increasing pressure of the spring under load above normal to permit a relative slip of said secondary surfaces corresponding to a plurality of turns, and means for producing a bodily movement of the clutch member toward and away from the motor driven member.

6. The combination with a motor driven member having a frictional driving surface, of a transmission shaft, a clutch member including a rim of large diameter carrying a primary frictional surface coöperating with the frictional driving surface of the motor driven member when fully engaged therewith to cause the clutch member to be rotated without slip under any load, said clutch member also having a sleeve extending at right angles from the plane of said rim and along the axis of the clutch member, said sleeve being provided with an internal secondary frictional surface, a transmission member rotatable with the transmission shaft and having a coöperating secondary frictional surface, a compression spring engaging said clutch member and said transmission member and adapted to hold the secondary surfaces in contact under sufficient pressure to prevent slipping of said surfaces under normal load and adapted to permit the transmission member to move against the progressively increasing pressure of the spring under load above normal to permit a relative slip of the secondary surfaces corresponding to a plurality of turns, and means for producing a bodily movement of the clutch member toward and away from the motor driven member.

7. The combination with a motor driven member having a frictional driving surface, of a transmission shaft, a clutch member interposed between said motor driven member and said shaft and having a primary frictional driving surface coöperating with the frictional driving surface of the motor driven member when fully engaged therewith to cause the clutch member to be rotated without slip under any load, said clutch member also having an internal thread, a transmission member rotatable with the transmission shaft and having an external thread engaging the internal thread of the clutch member, a pressure device engaging said clutch member and said transmission member and adapted to hold said threads in contact under sufficient pressure to prevent slipping of said threads under normal load and adapted to permit a relative slip of said threads for a plurality of turns under a load above normal, and means for producing a bodily movement of the clutch member toward and away from the motor driven member.

8. The combination with a motor driven member having a frictional driving surface, of a transmission shaft, a clutch member interposed between said motor driven member and said shaft and having a primary frictional driving surface coöperating with the frictional driving surface of the motor driven member when fully engaged therewith to cause the clutch member to be rotated without slip under any load, said clutch member also having an internal thread, a transmission member rotatable with the transmission shaft and movable on said transmission shaft in one direction only from normal position and having an external thread engaging the internal thread of the clutch member, a pressure device engaging said clutch member and said transmission member and adapted to hold said threads in contact under sufficient pressure to prevent slipping of said threads under normal load and adapted to permit a relative slip of said threads for a plurality of turns under a load above normal, and means for producing a bodily movement of the clutch member toward and away from the motor driven member.

9. The combination with a motor driven member, of a driving shaft supporting, rotating and projecting beyond said motor driven member, a clutch member including an internally threaded sleeve having an internal abutment, the forward end of said sleeve being slidably and rotatably supported on the projecting end of the driving shaft, a removable bearing secured at the rear end of the sleeve, a member carried by the sleeve and adapted for engagement with the motor driven member, a transmission worm working in the thread and having a central square aperture, a transmission shaft having a square end slidably engaging the worm aperture and having a cylindrical end projecting rearwardly through the bearing, means supported by and rotatable with the motor driven member and the clutch member for producing a bodily movement of the clutch member on the driving and transmission shafts to throw said clutch member into engagement with the motor driven member, and means adapted to engage the exterior of the bearing for producing a bodily movement of the clutch member in the opposite direction.

10. The combination with a motor flywheel, of a driving shaft supporting, rotating and projecting beyond said flywheel, a clutch member including a sleeve having a right-hand internal thread and an internal abutment, the forward end of the sleeve being slidably and rotatably supported on the projecting end of the driving shaft, a removable bearing secured at the rear end of the sleeve, and a member carried by the sleeve and adapted for engagement with the flywheel, a transmission worm working in the sleeve thread and having a central square aperture, a transmission shaft having a square end slidably engaging the worm aperture and having a cylindrical end projecting through the bearing, a spring supported by the motor driven member and the clutch member and adapted to throw the clutch member into engagement with the motor driven member, a left-hand coil spring inclosing the square end of the transmission shaft and bearing against the worm and abutment, and manually operated means adapted to engage the exterior of the bearing for throwing the clutch member out of engagement with the motor driven member.

In testimony whereof, I have signed my name to this specification in the presence of two subscribing witnesses.

SYDNEY I. PRESCOTT

Witnesses:
 FRANK H. VICK, Jr.,
 JAMES A. McCANN.